May 26, 1964 W. E. GLENN, JR., ETAL 3,134,852

COLOR SIGNAL SYSTEM

Filed Jan. 2, 1962 3 Sheets-Sheet 1

Inventors:
William E. Glenn Jr.,
Robert L. Watters,
by Richard R. Brainard
Their Attorney.

Inventors:
William E. Glenn Jr.,
Robert L. Watters,
by Richard R. Brainard
Their Attorney.

Inventors:
William E. Glenn Jr.,
Robert L. Watters,
by Richard R. Brainard
Their Attorney.

United States Patent Office 3,134,852
Patented May 26, 1964

3,134,852

COLOR SIGNAL SYSTEM

William E. Glenn, Jr., Scotia, and Robert L. Watters, Schenectady, N.Y., assignors to General Electric Company, a corporation of New York Filed Jan. 2, 1962, Ser. No. 163,539
15 Claims. (Cl. 178—5.4)

This invention relates to a color signal system for television circuits and more particularly to a color signal system applicable to production of color television images by diffraction.

As set forth and claimed in the Patent Number 2,813,146, granted November 12, 1957, to William E. Glenn, Jr., and assigned to the assignee of the present invention, projected color television images can be produced effectively as a function of diffraction gratings in a light modulating medium. The modulating medium may comprise, for example, a deformable liquid or a thermoplastic material as set forth and claimed in the copending application of William E. Glenn, Jr., Serial Number 84,424, filed January 23, 1961, as a division of application Serial Number 8,842, filed February 15, 1960 (now Patent No. 3,113,179, granted December 3, 1963), said application Serial Number 8,842 being a continuation-in-part of application Serial Number 698,167, filed November 27, 1957 (now abandoned), and of application Serial Number 783,584, filed December 29, 1958 (now abandoned).

Forming the diffraction gratings upon such a modulating medium or thermoplastic tape involves electrically impressing undulations on the particular material. For image projection the modulating medium bearing recorded diffraction gratings is placed in an optical projection system which includes a light source and a light masking system for masking non-diffracted light. Light is color selected by the diffraction gratings cooperating with the masking system whereby light for producing the desired color image passes through the masking system to a projection screen, but undesired colors do not.

In a specific form of the projection system according to the aforementioned patent, superimposed diffraction phase gratings are produced upon a modulating medium with an electron beam traversing this medium in a television raster sequence. The electron beam as it deflects across the medium is velocity modulated with three-color information so that an electron charge pattern is built up on the modulating medium. The pattern consists of alternate areas of high charge disposition and low charge disposition as the electron beam deflection is slowed down and speeded up by the velocity modulation. The areas of high charge deposition in succeeding trace lines act to form diffraction grating lines perpendicular to the direction of electron beam deflection.

According to a preferred form of the system as set forth in the aforementioned patent, three high frequency oscillators are modulated with the three separately detected color video signals corresponding to the three primary colors. The three oscillators produce frequencies appropriate to establish, by velocity modulation, the three phase gratings of the proper spacing on the modulating medium to diffract and in cooperation with a masking system to transmit the three primary colors. Therefore not only is separate detection and matrixing circuitry utilized for selecting three primary colors, but also the separate oscillators are employed for generating the phase gratings.

In the copending application of William E. Glenn, Jr., Serial Number 799,295, filed March 13, 1959 (now Patent No. 3,078,338, granted February 19, 1963), and assigned to the assignee of the present invention, a system is set forth and claimed for providing color television images wherein diffraction gratings representative of two primary colors are established in a first direction on the light modulating medium and another diffraction grating is established on the light modulating medium in a second direction substantially normal to the first. This arrangement improves upon the prior system in that certain cross-modulation or interference products are minimized. However, as in the system above, the three primary color video signals are separately detected before transforming such video signals into the phase grating signals for recording on the light modulating medium.

It is accordingly an object of the present invention to provide an improved color signal system which greatly reduces the circuitry necessary for detecting and establishing color signal components.

It is another object of the present invention provide a simplified and reliable color signal system for producing signals appropriate for establishing phase gratings in a light modulating medium.

In accordance with an important aspect of the present invention, color signals are provided through modulating a local oscillator signal with received color difference signals. Selected odd and even harmonics of the combined signal provide frequencies appropriate for directly establishing color phase gratings representative of the received color information upon the modulating medium.

According to another aspect of the present invention the local oscillator signal employed is the chroma reference signals, conventionally available in a television receiver and synchronized with the color burst phase of the transmitted color signal, and this reference is altered in phase to detect a received color difference signal. One such color difference signal is the red minus blue phase color signal and another is the red plus blue minus 2Y phase color signal where Y is picture luminance. One of these two color phase signals is shifted by 90° and then the two are synchronously detected with the chroma reference, a plus 2Y being added to the red plus blue phase signal.

According to an aspect of the invention, the synchronous detector conveniently comprises a pair of vacuum tubes fed in push-pull with the red minus blue and the red plus blue color phase signals, while the output of these two stages are connected in parallel to a frequency selective network or filter. In accordance with this configuration, harmonic signals are produced. The odd harmonics subtract and even harmonics add such that odd harmonics contain red color information and the even harmonics contain blue color information. Selected harmonics appropriate to directly establish velocity modulated phase gratings on the light modulating medium are coupled to deflect the raster-tracing electron beam whereby red and blue information is written on the medium. Green information, that of the remaining primary color, is preferably established in a direction orthogonal to the red and blue direction, for example, by employing the raster lines themselves as diffraction grating elements.

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

Figure 1:
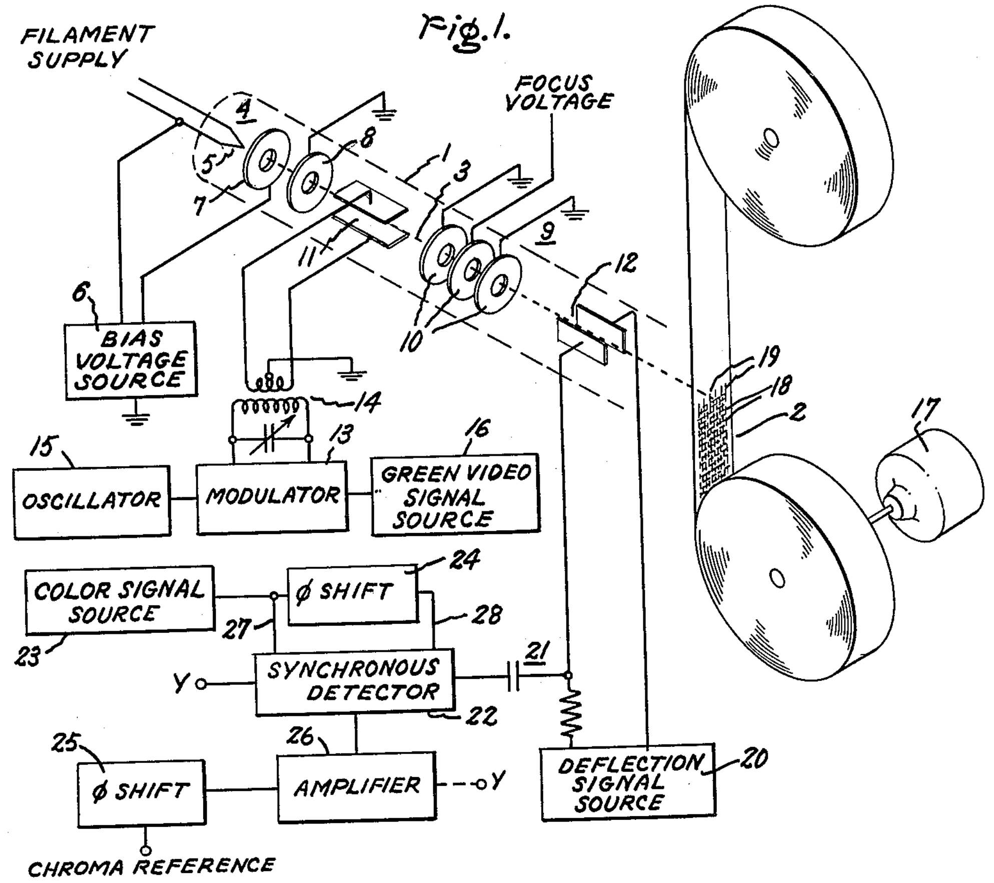
FIG. 1 is a schematic illustration of an electron writing apparatus employed in accordance with the present invention.

In FIG. 1 there is illustrated an electron writing system enclosed in an evacuated enclosure 1 producing phase diffraction gratings in a light modulating medium 2 which may be a tape with a thermoplastic surface such as described and claimed in my copending application Serial Number 8,842, as aforementioned. Medium 2 may be any material that, when subjected to an electron charge or beam, changes in physical characteristics, such as transparency or surface irregularity affecting the transmission or reflection of light. Medium 2 is also enclosed in an evacuated enclosure (not illustrated) that is connected to enclosure 1.

The electron beam 3 is transmitted by an electron gun assembly 4 comprising a point source of electrons, hairpin filament 5. Filament 5 is heated by the passage of filament current and is further maintained at a high negative potential with respect to ground by a voltage supplied from a bias voltage source 6 which also supplies a bias voltage to a control electrode 7 for determining the magnitude of the beam current. In television applications, control electrode 7 is also energized after each deflection of the beam by a blanking signal that may be obtained from a conventional blanking signal circuit (not shown). Ground potential applied to an anode 8 determines the beam voltage.

The focusing system 9 is conveniently an einzel lens comprising three rings 10. The end rings are preferably grounded while the intermediate ring is energized by a focus voltage on the order of several kilovolts.

The deflection system is an electrostatic deflection system comprising vertical deflecting plates 11 and horizontal deflecting plates 12. Plates 11 are energized from a modulator 13 including a push-pull R.F. output tank circuit 14 coupled to plates 11 on either side of ground. In modulator 13 the output of an oscillator 15 is modulated with green video signal from a source 16, the green video signal being derived according to standard television receiver practices. The oscillator 15 conveniently produces a two to three volt R.M.S. radio frequency signal at a frequency between 50 and 60 megacycles, and is arranged so that its full output corresponds to a black video level.

In accordance with the apparatus illustrated in FIG. 1, the television raster horizontal deflection is provided by horizontal deflection plates 12. In the embodiment as shown in FIG. 1, vertical deflection is not necessary for producing a television raster because the thermoplastic medium 2 is continuously moved past the horizontal electron beam by a motor 17 arranged to have a speed fast enough to produce a convenient raster impression upon the medium 2, i.e. one convenient for producing green diffraction grating lines as hereinafter set forth.

Vertical deflection plates 11 rather than being employed for vertical deflection, are employed for spreading the electron beam from the electron gun to defocus the electron beam in accordance with the green video signals from source 16. The diffraction grating on the modulating medium 2 corresponding to the color green consists of horizontally extending lines of charge, i.e., the raster lines produced by the electron beam as it traverses horizontally across the modulating medium. If the electron beam 3 is not spread by vertical deflection plates 11, the charge density along the raster line is a maximum and the resulting diffraction grating is of maximum amplitude, corresponding to the maximum intensity of green color information, while if plates 11 spread or wobble the electron beam, the charge density along the raster lines is less, corresponding to a lower intensity of the green color information. Therefore, modulator 13 is driven by green video signal source 16 having an amplitude in inverse proportion to the intensity of the green video information. Formation and projection of green color recorded in this manner, together with an example of appropriate raster line spacing is set forth in the copending application of William E. Glenn, Jr., Serial Number 835,208, filed August 21, 1959 (now Patent No. 3,118,969, granted January 21, 1964), and assigned to the assignee of the present invention.

In the present example, the size of the raster on medium 2 is approximately .9 inch high consisting of 262½ raster lines formed in $\frac{1}{60}$ of a second and is approximately 1.2 inches wide (across the tape) consisting of a phase grating comprising approximately 1000 grating lines, more or less, depending upon the modulated signals, harmonics of the 3.58 mc. color subcarrier, which are employed to produce the phase grating. For a third harmonic (red) phase grating, 750 lines are produced, while a fourth harmonic (blue) grating has 1000 lines.

Horizontal deflecting plates 12 are energized with the complex signal that, for color television application, includes the conventional horizontal television deflection signal obtained from a source 20 which is added to color information in an adding network 21. In accordance with an important aspect of the present embodiment, such color information is derived directly from the output of synchronous detector 22. Synchronous detector 22 has applied thereto color signal information conveniently illustrated as emanating from a color signal source 23, both directly, and shifted in phase by means of a phase shift network 24. Color signal information thus applied to synchronous detector 22 is the chrominance signal which may be derived from the chrominance band pass filter in the conventional color television receiver. The color information is detected in synchronous detector 22 with the local chroma reference signal derived from the local chroma reference oscillator, which is shifted in phase by phase shift network 25 before application to synchronous detector 22 through amplifier 26. Luminance signal Y is coupled either to synchronous detector 22, or amplifier 26, in a manner to cancel the luminance component in a particular color phase of the color signal, as hereinafter more fully set forth.

Figure 4:
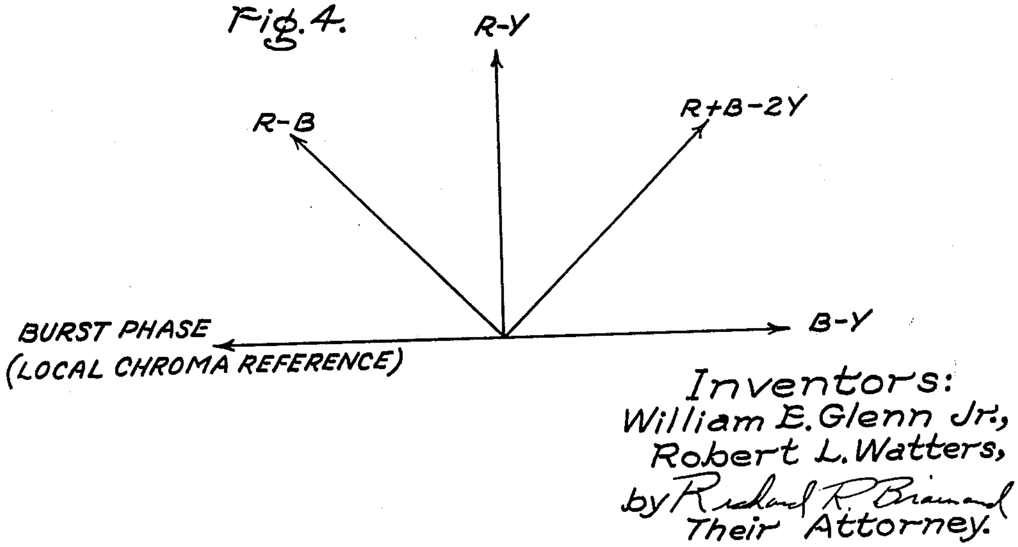
FIG. 4 is a vector diagram illustrating the relationship of various color television signal components.

The present invention may be better understood with reference to the vector diagram of FIG. 4.

FIG. 4 illustrates several phase aspects of the color portion of a color television signal, important to consideration of the present invention. The television color signal may be considered as a color subcarrier of approximately 3.58 megacycles (with respect to the picture carrier) modulated in quadrature by a pair of color difference signals here illustrated as $B-Y$ (blue minus luminance) at zero degrees, and $R-Y$ (red minus luminance) at 90°. The color subcarrier itself is not transmitted but a color burst phase, synchronized with the color subcarrier, is transmitted at 180° from the $B-Y$ phase, and is located on the "back porch" of the horizontal sync pulse. The burst is employed to synchronize the local chroma reference oscillator in a given phase which is here taken to be 180°.

The television color signal may be thought of as a vector whose phase represents the particular color or hue transmitted, and whose length is representative of the strength or saturation of a particular color. The color signal is conventionally detected in the $B-Y$ and $R-Y$ phases by using the local chroma reference. Red is formed by the addition of the Y signal to $R-Y$, and blue is produced by the addition of Y to $B-Y$. A $G-Y$ signal, representative of green, is readily produced by a combination of $R-Y$ and $B-Y$ and can then be detected in the same manner for conventional color television purposes.

However, in accordance with the present invention, $R-Y$ and $B-Y$ are not employed, but a different pair of quadrature signals are utilized, namely, $R-B$ and $R+B-2Y$, shown on the vector diagram. The position (at 45° and 135°) of these vectors directly follows from the position of the $B-Y$ and $R-Y$ signals. That is, $R-Y$ and $B-Y$ add to produce $R+B-2Y$, and it is seen that $R-Y$ and the negative of $B-Y$ will add to produce $R-B$ as shown. We have found the combination color signals $R-B$ and $R+B-2Y$ to be particularly useful in directly producing red and blue phase diffraction grating signals for the light modulating medium without the need of extensive detecting or demodulating and subsequent remodulating equipment.

Referring again to FIG. 1, the color signal (of negative polarity) is coupled directly to synchronous detector 22 by lead 27 and may be detected therein in the $R-B$ phase. The same color signal is retarded 90° through a phase shift network 24. Then the $R+B-2Y$ phase (90° from the $R-B$ phase without shift) will enter synchronous detector 22 through lead 28 in phase opposition to $R-B$ to provide a push-pull input. These two signals are simultaneously detected in synchronous detector 22 with an amplified reference signal from the local chroma reference oscillator which is retarded in phase by 45° by phase shift network 25. Thus it appears that $R-B$ and $(R+B-2Y)$ as well as the local chroma reference signal are arranged to arrive simultaneously in synchronous detector 22. A negative polarity of color signal will actually be applied at lead 27 whereby the detected output is considered positive after inversion in synchronous detector 22.

The synchronous detector, being a very non-linear device, conveniently produces harmonics of the $R-B$ and $R+B-2Y$ signals and, as will further appear, even harmonics of these signals will add to produce a blue signal while odd harmonics will add to produce a red signal. These signals comprising the output of synchronous detector 22 occur at frequency harmonics of the local chroma reference appropriate for direct use in establishing red and blue gratings on light modulating medium 2. To this end, the output of synchronous detector 22 is added to the output of horizontal deflection source 20 in adder network 21 and is applied to horizontal deflection plates 12. A velocity modulation is thereby imparted to the electron beam 3 producing concentrations and rarifications of electron deposition on modulating medium 2, establishing vertical diffraction lines 19 thereon. It is these lines, 19, which diffract red and blue light in a horizontal direction, that is across the tape, when this tape is placed in a Schlieren optical system.

Figure 2:
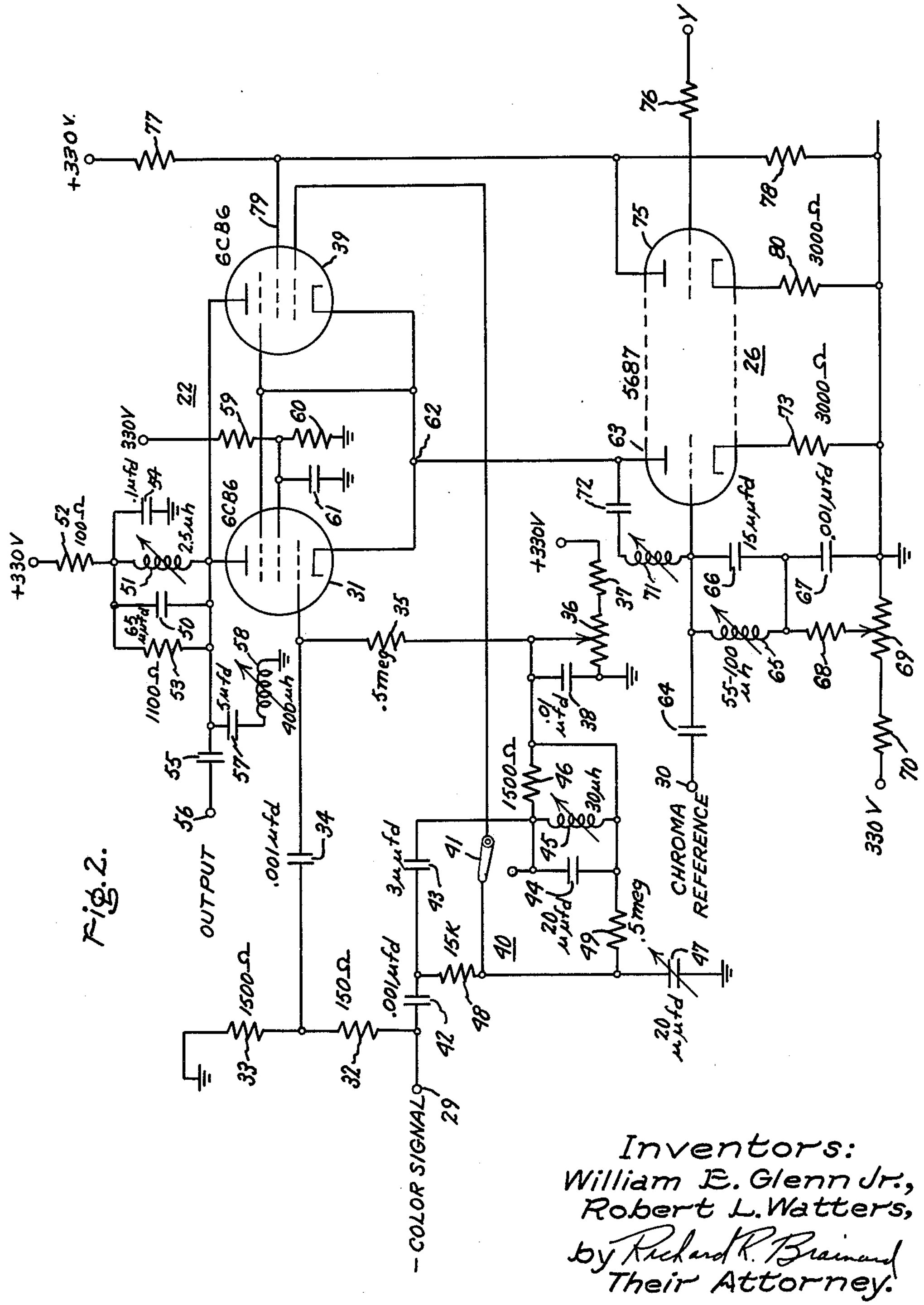
FIG. 2 is a schematic diagram of a first embodiment of a color signal system circuit in accordance with the present invention.

The invention will be more clearly understood with reference to FIG. 2, a schematic diagram of circuitry in accordance with the present invention. In the FIG. 2 circuit, color signal information (conveniently of negative polarity) derived for example from a chrominance second detector in a color television receiver, via a chrominance band pass filter, is applied directly to terminal 29. The local chroma reference from a local oscillator is applied at terminal 30 and this chroma reference signal is taken to be in phase with the burst phase in FIG. 4, i.e. at 180° on the vector diagram. The color signal is applied directly to the control grid of tube or valve 31 from the midpoint of a voltage divider consisting of resistors 32 and 33 extending from terminal 29 to ground, and via a coupling capacitor 34. A grid resistor 35 is provided between the control grid of tube 31 and a bias-adjusting potentiometer 36, supplied a positive B+ voltage with respect to ground which is dropped by resistor 37. A condenser 38 bypasses the potentiometer arm to ground.

The color signal applied at terminal 29 is also coupled to tube or valve 39 by means of a phase shift network, generally designated at 40. This phase shift network is arranged to shift the phase of the color signal by a ±90° under the control of double throw switch 41 before application to the grid of tube 39. In the switch position shown the phase shift network produces a 90° retardation in the phase of the color signal before application to the grid of tube 39. The input for the control grid of tube 39 is obtained across capacitor 47 which receives color signal via capacitor 42 and resistor 48, capacitor 47 being returned to ground. The voltage the control grid of tube 39 sees across capacitor 47 will be the color signal retarded by 90° for the upper switch position. In this arrangement, the control grid of tube 39 is supplied D.C. bias from potentiometer 36 through resistor 49.

Although the circuit is conveniently operated wherein phase shift network 40 retards the phase of the color signal by 90°, the system may alternatively be operated by reversing various phase relationships in the circuit.

For the lower position of switch 41, a capacitor 42 in series with a second capacitor 43 couples the color signal to the parallel combination of capacitor 44 and inductance 45, the combination being returned to ground through capacitor 38. In this arrangement the inductance is adjustable and is arranged to predominate at the color signal frequency. The grid of tube 39 is supplied bias from bias potentiometer 36 through resistor 46 connected to a high side of the parallel circuit.

Tubes 31 and 39 comprise synchronous detector, 26, receiving two different phases of the color signal on the control grids thereof in what may be described as a push-pull configuration. These tubes have their anodes connected in parallel to a common output circuit including a parallel combination of capacitor 50 and inductance 51 interposed between the anodes and resistor 52, connecting to the B+ supply voltage. The combination of the inductance and the capacitance in the illustrated embodiment is tuned to approximately 12.5 megacycles to pass the third and fourth harmonic of the local chroma reference frequency. The parallel tuned circuit is shunted by resistor 53 for broadening the "pass band" of the output circuit. The high voltage side of the parallel circuit is returned to ground by bypass condenser 54 while the output of the circuit is delivered from the common anode connection through capacitor 55 to output terminal 56.

The common anode connection is also shunted to ground by a series tuned circuit consisting of capacitor 57 and inductance 58, forming a trap at the local chroma reference frequency. Resistors 59 and 60, disposed in series between the B+ voltage and ground, provide a center tap for supplying screen grid voltage to tube 31. The screen grid is bypassed to ground through capacitor 61. The suppressor grids of tubes 31 and 39 are connected to a common cathode connection 62 connected to the anode of tube 63.

Tube 63 is a synchronous detector driver introducing the detecting local chroma reference signal into tubes 31 and 39. The local chroma reference signal from the local color television receiver local oscillator is applied through capacitor 64 to the grid of tube 63 and there is interposed between the grid and ground a parallel circuit consisting of inductance 65 and capacitor 66, ground return being completed by means of capacitor 67. This circuit accomplishes a 45° delay in the reference signal. The tuned circuit is arranged to be predominantly capacitive, i.e. is tuned below the local chroma reference frequency therefore providing a phase delay at the grid of tube 63 of approximately 45°. Grid bias is supplied through resistor 68 extending from the low side of the parallel circuit to a potentiometer 69 whose end terminals are interposed between ground and a dropping resistor 70 connected to the B+ supply. Tube 63 is neutralized with a series combination of inductance 71 and capacitance 72 interposed between the anode and the grid of the tube. Resistor 73 connects the cathode of tube 63 to ground.

The tube 63 amplifies the local chroma reference signal to a value about 5 times cutoff of tubes 31 and 39 for application to the cathodes of tubes 31 and 39. The bias arrangement is such that tube 63 permits conduction of the synchronous detector tubes 31 and 39 for only a short portion of the chroma reference cycle whereby the portion of the color signal detected is in a particular chosen phase. The local chroma reference is delayed 45° by the parallel combination of inductance 65 and capacitance 66 so that synchronous detection in the illustrated embodiment will take place at the 135° point, i.e. in the $R-B$ phase as illustrated in the vector diagram of FIG. 4. This phase-delayed chroma reference signal as applied to the cathode of tube 31 detects the $R-B$ phase of the television color signal and provides this $R-B$ signal at the anode thereof. However, since the phase shift circuit 40 for the switch position shown for switch 41 retards the phase of the color signal by 90°, the $(R+B-2Y)$ color phase will be detected by the delayed chroma reference in tube 39.

It is desirable to remove the "2Y" term from this signal and therefore, another tube, 75 is provided having the Y or luminance signal from a standard color television receiver applied to its grid through resistor 76. The Y signal will be inverted in phase at the anode of tube 75 which is connected to the midpoint of a voltage divider consisting of resistors 77 and 78 extending between B+ voltage and ground. This same midpoint is also connected to the screen grid of tube 39 at 79, coupling a negative Y signal thereto. If the polarities are followed through it will be noted that this added Y or luminance signal will be in the correct phase to cancel the "2Y" term from the $(R+B-2Y)$ signal in tube 39. The amplification of the tube 75 is arranged to be sufficient for cancelling the 2Y term. The cathode of tube 75 is returned to ground through resistor 80.

In operation, the circuit of FIG. 2 synchronously detects the color signal, providing an $R-B$ phase at the common synchronous detector anode connection through tube 31, and an $R+B$ phase at the common anode connection through tube 39. These phases are detected by arranging the local chroma reference to occur simultaneously with the $R-B$ phase while the $R+B-2Y$ phase is retarded 90° to occur in phase opposition. The synchronous detector being a highly non-linear device rich in harmonic output and a circuit of the "push-pull" variety having a push-pull input and a parallel output the $R-B$ and $R+B-2Y$ signals amplitude produce amplitude modulation on certain harmonics of the 3.58 megacycle chroma reference signal. This circuit configuration has the property of adding even harmonics and subtracting odd harmonics generated in the circuit in the output thereof. Since $(R+B)+(R-B)=2R$ and $$(R+B)-(R-B)=2B$$

it will be seen then that odd harmonics will contain only red modulation and even harmonics contain only blue modulation. A pair of successive odd and even harmonics are selected by means of the band pass parallel tuned circuit 50—51, whereby a given harmonic contains red modulation while the next contains blue modulation.

The second and third, or the third and fourth harmonics are conveniently employed since these harmonics of 3.58 megacycles are quite appropriate for directly establishing phase diffraction gratings 19 in the modulating medium 2 of FIG. 1. In the illustrated circuit third and fourth harmonics are selected with band pass circuit 50—51. The second and third harmonics may also be used. When the lower harmonic is used for blue and the higher harmonic is used for red, blue light passes through the slot in the output masking arrangement adjacent the bar which blocks the zero order light and the red light will skip a slot, i.e. will pass through the second slot from the bar that blocks the zero order light. This relationship between the frequency used for the color components of different wavelengths of light and the light masking system which cooperates therewith is described and broadly claimed in my copending application Serial Number 320,912, filed November 1, 1963, as a continuation-in-part of my copending application Serial Number 49,746, filed August 15, 1960, both applications being assigned to the assignee of the present invention. If the lower harmonic is used for red, light diffracted by both gratings will normally skip a slot in the output masking system. The masking system may be of the type, for example, set forth in the aforementioned copending application of William E. Glenn, Jr., Serial Number 835,208, filed August 21, 1959, and assigned to the assignee of the present invention.

It is sometimes desirable to generate odd harmonics which are blue and even harmonics which are red, depending upon the particular projection and masking system to be employed. In such case switch 41 is thrown in the downward position so as to advance the color signal by 90°.

Although a push-push detector is illustrated, other harmonic generators with adding and subtracting features or circuits may be employed. A push-pull circuit, for example, will add odd harmonics and subtract even.

The output from terminal 56 is applied directly to the horizontal deflection plates in FIG. 1 via the adder 21 in combination with signal source 20, and thereby directly produces the desired velocity modulation of the electron beam 3 to form diffraction grating lines 19 on modulating medium 2.

Figure 3:
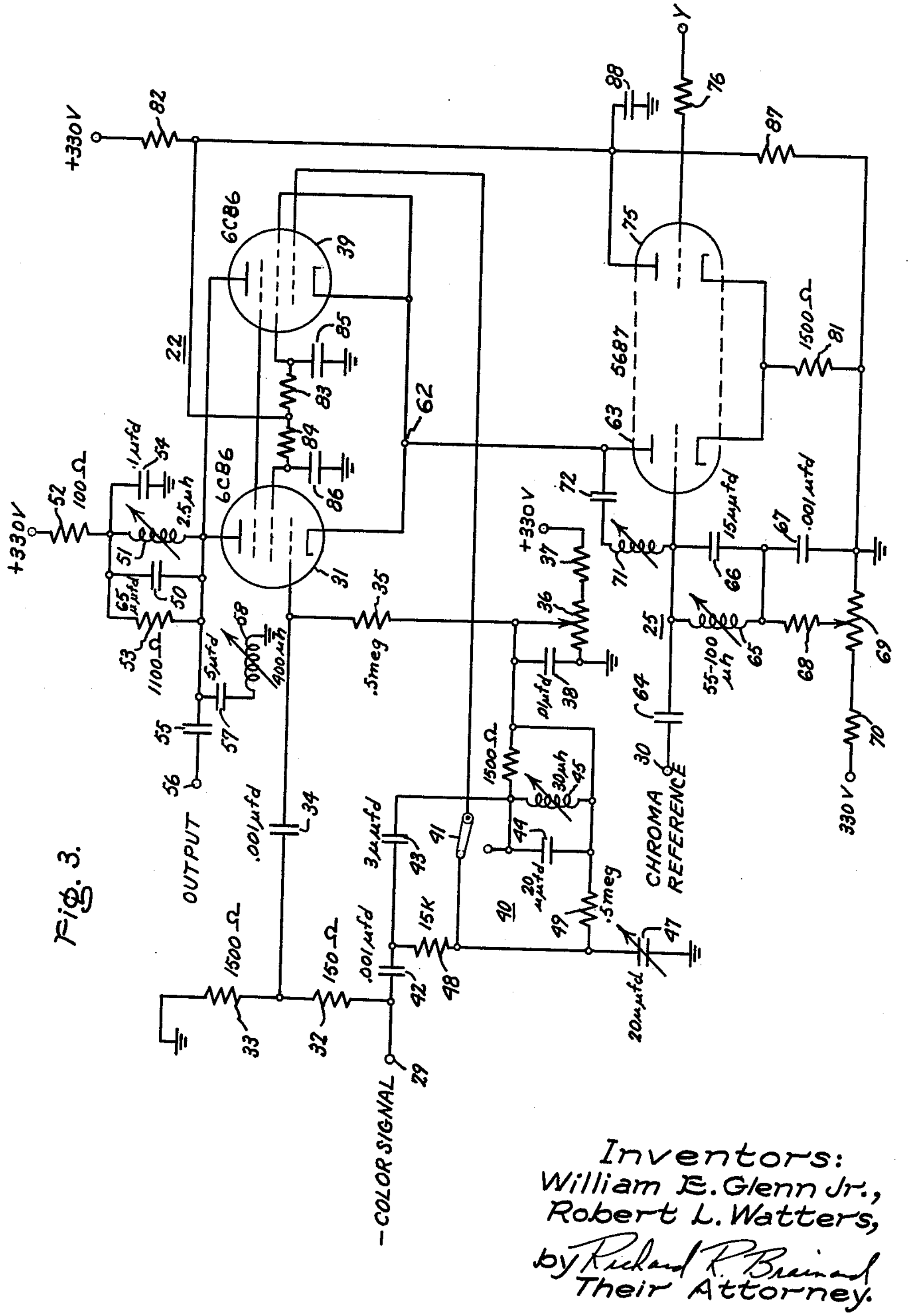
FIG. 3 is a schematic diagram of another embodiment.

FIG. 3 is a schematic diagram of another embodiment of the present invention wherein like reference numerals refer to like elements as set forth with reference to FIG. 2. The embodiment is substantially the same as the FIG. 2 embodiment with respect to such elements and will be described in connection with differing features. In the FIG. 3 embodiment the Y chrominance signal applied to tube 75 is then coupled to chroma reference driver tube 63 through a common cathode resistor 81, rather than being applied to the screen grid of tube 39. It will thus appear that a Y term is added to both sum and difference components of the color signal; however, such a simplified arrangement has been found to operate quite satisfactorily in practice and does not materially affect the color quality produced.

In this latter embodiment the screen grid of tube 39 as well as the screen grid of tube 31 is energized from the B+ supply through the series combination of resistor 82 and resistors 83 and 84, respectively. The screen grids are bypassed to ground with capacitors 85 and 86, respectively. This arrangement permits more symmetrical operation of tubes 31 and 39.

Resistor 82 forms a portion of voltage divider between B+ and ground, resistor 87 forming the other section of such divider. The midpoint is connected to supply voltage to the anode of tube 75 and this midpoint is held nearly constant D.C. potential by a large capacitor 88, returned to ground. The circuit operation of the FIG. 3 embodiment is essentially the same as that of the FIG. 2 embodiment.

The system according to the present invention leads to a reduction in the number of vacuum tubes by approximately a factor of three over the prior system. Moreover, the system is simpler and since only the local chroma reference oscillator is employed as a local frequency source, fewer adjustments are necessary to apparatus employing the present circuitry. This advantage is aided by the fact that the local chroma reference frequency is always synchronized with the television color subcarrier through the synchronizing medium of the color burst signal. The apparatus according to the present invention employing the fourth harmonic for red and third harmonic for blue is also convenient in that the output bar system in a projection apparatus chosen to block undesired color will also block higher order undesired colors due to the harmonic relationship of the high frequency color carriers employed.

This is not to say that another local high frequency oscillator may not be employed. Thus, if desired, other local oscillators may be employed which produce high frequency signals on the order of harmonics described, i.e. frequencies that are appropriate for the phase gratings in the modulating medium. In the latter instance one such locally generated high frequency may be modulated for one color signal, for example, blue, while another high frequency signal may be modulated with a color signal, for example, red. The red and blue modulation values can be secured as presently disclosed by adding and subtracting the color sum and difference signals. The local oscillator or oscillators are desirably synchronized with the horizontal sync frequency, as the color subcarrier frequency is so synchronized. As another alternative, one may provide a single local oscillator frequency, preferably synchronized as above, further producing various harmonics thereof for modulation by the aforementioned color signals either before or after the harmonic production.

It is apparent that transistors or the like may be substituted for the valves illustrated as vacuum tubes. Also components and values may be altered.

While we have shown and described several embodiments of our invention, it will be apparent to those skilled in the art that many other changes and modifications may be made without departing from our invention in its broader aspects; and we therefore intend the appended claims to cover all such changes and modifications as fall within the true spirit and scope of our invention.

What we claim as new and desire to secure by Letters Patent of the United States is:

1. A system of producing a pair of high frequency color signals whose amplitudes are representative of two different colors from a color television signal comprising means for producing a local oscillator signal having the frequency of the color subcarrier, means for establishing a first harmonic of said local signal with an amplitude dependent upon one of said colors, and means for establishing a different harmonic of said local oscillator signal with an amplitude dependent on another of said colors.

2. The method of velocity modulating an electron beam with two different color signals obtained from sum and difference color television signals which signals comprise quadrature modulation components of a color subcarrier frequency, said method comprising the steps of locally reproducing said sum and difference signals as modulation of plural high frequency signals which are higher in frequency than the color subcarrier frequency, adding said sum and difference high frequency signals to obtain a first color signal, subtracting said sum and difference high frequency signals to obtain another color signal, and applying these color signals to produce deflection of said electron beam.

3. A method of producing an information-bearing electron beam as a function of a standard television signal comprising the steps of detecting combination color signals, arithmetically combining said combination signals to produce color signals primarily representative of different colors, deriving the signals primarily representative of different colors as modulation components of locally generated high frequency signals, and modulating an electron beam therewith, wherein said locally generated high frequency signals have a frequency ratio approximately proportional to the frequency ratio of the said different colors.

4. A system for producing red and blue color components of a color television signal from the standard color television signal including a red minus blue component and a component which is primarily red plus blue comprising means for generating plural local high frequency components of separate frequencies substantially harmonically related and higher in frequency than the color subcarrier frequency, means for detecting said red minus blue and red plus blue components and for modulating said local high frequency components therewith including means for adding said red minus blue and red plus blue signals to produce a component corresponding to one particular color and for subtracting said red minus blue and red plus blue signals to produce another component corresponding to another particular color.

5. The apparatus as set forth in claim 4 further including means for combining a luminance Y signal with said red plus blue signal.

6. A system for presenting color information corresponding to a display comprising a light modulating medium, electrical means subjecting said light modulating medium to intelligence signals for establishing diffraction gratings thereon as obtained from sum and difference color signals, and means for adding said sum and difference signals to produce one color intelligence signal corresponding to a particular color and for subtracting said sum and difference signals to produce another color intelligence signal corresponding to another particular color.

7. A system for obtaining resultant signals from sum and difference signals comprising means for producing a local high frequency signal, means for modulating said high frequency signal with said sum and difference signals to produce sum and difference modulation components, and circuit means responsive to harmonics of said modulated local high frequency signal for adding selected harmonics of the sum and difference modulation components to produce one resultant and for subtracting selected harmonics of said sum and difference modulation components to produce a second resultant.

8. A system for producing red and blue color components of a standard color television signal including a red minus blue component and a component which is red plus blue minus 2Y as well as a Y luminance signal comprising means for generating a local signal synchronous with the horiontal synchronization of said color television signal, means for detecting said red minus blue signal and for modulating said local high frequency signal therewith, means for detecting said red plus blue signal and for modulating said high frequency signal therewith and means for combining the two modulated signals in a manner to provide odd and even harmonics thereof, the said harmonics combining to produce a blue color signal and a red color signal.

9. The system as set forth in claim 8 further including means for combining an amplified Y luminance signal with said red plus blue minus 2Y component in inverse phase to essentially remove the 2Y term.

10. A system for presenting color television information by means of diffraction gratings on a light modulating medium derived from a standard color television signal including a red minus blue component and a component which is primarily red plus blue, comprising a light modulating medium, electrical means subjecting said light modulating medium to intelligence signals for establishing diffraction gratings on said medium, local oscillator means for generating a high frequency signal, detection means for deriving said red minus and red plus blue components and for modulating said high frequency signal therewith, and frequency responsive means for combining the modulated components of said high frequency signal to obtain odd and even harmonics thereof which form said intelligence signals, the said odd harmonics combining to produce a red color intelligence signal and even harmonics combining to produce a blue color intelligence signal.

11. The apparatus as set forth in claim 10 further comprising electrical means subjecting said light modulating medium to a third intelligence signal oriented to establish a diffraction grating substantially normal to said aforementioned diffraction gratings on said medium, a second local oscillator means producing a second high frequency signal and a green signal source modulating said second high frequency signal to produce said third intelligence signal.

12. Apparatus for producing red and blue color modulated components of a color television signal from a standard color television signal including a red minus blue component and a component which is primarily red plus blue comprising a local chroma reference oscillator synchronized with the color subcarrier of said color television signal, detection means for deriving said red minus blue signal, means for modulating said local chroma reference signal therewith, detection means for deriving said red plus blue signal, means for modulating said chroma reference signal therewith, means for combinig the last two modulated signals, frequency selective means responsive to selected odd and even harmonics of the combined signals, the said harmonics combining to produce a blue signal and a red signal.

13. A system for producing red and blue color components of color television signals from a standard color television signal including a red minus blue component and a component which is primarily red plus blue as well as a Y luminance signal comprising an oscillator generating a local chroma reference frequency, a synchronous detector for detecting said red plus blue and red minus blue components by means of said local chroma reference frequency, said synchronous detector comprising a pair of active valve devices driven in push-pull with the color information from said color television signal as a first input thereof and the same color information shifted in phase for the other input thereof, said valve devices having a common parallel output which subtracts odd harmonics and adds even harmonics to produce red and blue color signals respectively.

14. A system for producing red and blue color components of a color television signal including a red minus blue component and a component which is primarily red plus blue as well as a Y luminance signal comprising means for producing a local chroma reference signal and for phase shifting said local chroma signal with respect to the burst phase to be in phase to detect one of the aforesaid components, a synchronous detector comprising a pair of valve means receiving the color information from said color television signal as an input to one valve means, means phase shifting the same color information 90° as the input to the other valve means, both said valve means having a common output circuit including a frequency selective network responsive to harmonics of said chroma reference signal, and means for applying said phase shifted chroma reference signal to activate in phase therewith said valve means for detection of said components, the said color components combining in said common output to produce red and blue color carrying signals having harmonic relation to said chroma reference signal.

15. A system for producing red and blue color components of a color television signal including a red minus blue component and a component which is primarily red plus blue as well as a Y luminance signal comprising means for producing a local chroma reference signal and for phase shifting said local chroma signal with respect to the burst phase to be in phase to detect one of the aforesaid components, a synchronous detector comprising a pair of amplifying means receiving a push-pull phase the color information from said color television signal and the same color information phase shifted substantially 90°, said amplifying means having a common parallel output including a frequency selective network responsive to harmonics of said chroma reference signal, means for applying said phase shifted chroma reference signal to energize one of said amplifying means which is primarily responsive to the red minus blue color component for detection of that component, and means for applying the phase shifted chroma reference signal and a Y luminance signal to energize the other amplifying means for detection of the red plus blue minus 2Y color component in order to remove said 2Y term, said color components combining in said parallel output to produce red and blue color carrying signals having harmonic relation to said chroma reference signal.

References Cited in the file of this patent

UNITED STATES PATENTS

| | | |
|---|---|---|
| 2,864,951 | Loughlin | Dec. 16, 1958 |
| 2,919,302 | Glenn | Dec. 29, 1959 |
| 3,003,024 | Nygard et al. | Oct. 3, 1961 |